(12) United States Patent
Lo et al.

(10) Patent No.: US 7,403,716 B2
(45) Date of Patent: Jul. 22, 2008

(54) OPTICAL MODULE FOR BI-DIRECTIONAL COMMUNICATION SYSTEM

(75) Inventors: Adrian Lo, Tokyo (JP); Makoto Sekijima, Tokyo (JP); Kenjiro Hata, Tokyo (JP); Tohru Kineri, Onoda (JP); Naoki Hanashima, Tokyo (JP)

(73) Assignee: TDK Corporation, Tokyo (JP)

( * ) Notice: Subject to any disclaimer, the term of this patent is extended or adjusted under 35 U.S.C. 154(b) by 546 days.

(21) Appl. No.: 10/884,953

(22) Filed: Jul. 7, 2004

(65) Prior Publication Data

US 2005/0158054 A1    Jul. 21, 2005

(30) Foreign Application Priority Data

Jan. 15, 2004 (JP) .............................. 2004-008496

(51) Int. Cl.
*H04B 10/00* (2006.01)

(52) U.S. Cl. .......................... 398/139; 398/138; 385/88

(58) Field of Classification Search ......... 398/135–139; 385/88–94

See application file for complete search history.

(56) References Cited

U.S. PATENT DOCUMENTS

| | | | | |
|---|---|---|---|---|
| 5,552,918 | A | 9/1996 | Krug et al. | 359/152 |
| 6,179,483 | B1 | 1/2001 | Kanazawa | 385/93 |
| 6,332,720 | B1 | 12/2001 | Shimaoka et al. | 385/88 |
| 6,493,121 | B1 | 12/2002 | Althaus | 359/152 |
| 6,854,897 | B2 * | 2/2005 | Furumai et al. | 385/73 |
| 2002/0028049 | A1 | 3/2002 | Bartur et al. | 385/92 |
| 2004/0218857 | A1 | 11/2004 | Hung | 385/31 |

FOREIGN PATENT DOCUMENTS

| | | |
|---|---|---|
| EP | 0 331 436 A2 | 2/1989 |
| EP | 0 347 120 A2 | 6/1989 |
| EP | 0 542 011 A1 | 10/1992 |
| EP | 0 715 195 A1 | 12/1995 |
| EP | 2003255196 | 2/2002 |
| EP | 0 644 668 B1 | 7/2002 |
| EP | 2002296456 | 10/2002 |
| EP | 2003075687 | 3/2003 |
| JP | 61156208 | 7/1986 |
| JP | H02-071205 | 3/1990 |
| JP | 6-160674 | 6/1994 |

(Continued)

OTHER PUBLICATIONS

European Search Report for Application No. EP04255838 dated Dec. 3, 2004.

(Continued)

*Primary Examiner*—Agustin Bello
(74) *Attorney, Agent, or Firm*—Wolf Law Offices, PLLC; Kevin Alan Wolff

(57) ABSTRACT

The optical module includes a main housing, a filter support component, which can affix an optical fiber, supported by a first attachment section, a light-emitting component supported by a second attachment section, a light-receiving component supported by a third attachment section, and first and second optical filters supported by a filter support component. The filter support component has a first surface and a second surface. The first optical filter is mounted on the first surface of the filter support component. The second optical filter is mounted on the second surface of the filter support component.

20 Claims, 8 Drawing Sheets

FOREIGN PATENT DOCUMENTS

| | | |
|---|---|---|
| JP | H08-005862 | 1/1996 |
| JP | H10-332990 | 12/1998 |
| JP | 2002-296456 | 9/2002 |
| JP | 3095902 | 8/2003 |
| JP | 2003-052447 | 9/2003 |
| JP | 2003-255196 | 10/2003 |
| JP | 2003-279808 | 10/2003 |
| JP | 3097224 | 1/2004 |
| WO | WO 03/029857 A1 | 7/2002 |
| WO | WO 03/029857 A1 | 4/2003 |

OTHER PUBLICATIONS

European Search Report for Application No. EP04255768 dated Dec. 21, 2004.

European Search Report for Application No. EPP91130 dated May 9, 2005.

Translation of Relevant Portion of Japanese Office Action dated Feb. 19, 2008.

* cited by examiner

OPTICAL MODULE FOR BI-DIRECTIONAL COMMUNICATION SYSTEM

TECHNICAL FIELD

The present invention relates to an optical module and particularly to an optical module for bi-directional communication system.

BACKGROUND OF THE INVENTION

In recent years, the development of the Internet has made it possible for people to access large quantities of information in real time and to handle large quantities of information. Information is transmitted by copper wire, optical fiber and wirelessly, but optical fiber is particularly superior for sending large volumes of information at high speeds. In the future, optical fiber is expected to be installed in each home.

However, because at the terminal end information is processed using electric signals, not optical signals, an optical module has to be used between an optical fiber and a terminal in order to connect the optical fiber to the terminal. An optical module is a device that converts optical signals received from the optical fiber to electric signals and supplies the electric signals to the terminal, and converts electric signals from the terminal to optical signals that are supplied to the optical fiber. In the prior art, various types of optical module have been proposed.

FIG. 10 is a cross-sectional diagram showing the structure of a conventional optical module 10 described in Japanese Utility Model Registration No. 3,095,902. The optical module 10 includes a main housing 12, an optical fiber 14 supported by the optical module 10, a light-emitting component 16, a light-receiving component 18, a filter support member 20 provided in the main housing 12, and an optical filter 22 supported by the filter support member 20.

In the optical module 10 shown in FIG. 10, the optical fiber 14 and light-receiving component 16 are disposed in a straight line and the light-receiving component 18 is disposed at an angle of 90 degrees to the straight line. The optical filter 22 reflects received light 14a supplied from the optical fiber 14 and transmits transmitted light 16a produced by the light-emitting component 16. The filter support member 20 supports the optical filter 22 at an angle of 45 degrees to the straight line. Thus, received light 14a from the optical fiber 14 is reflected by the optical filter 22 to fall incident on the light-receiving component 18, and transmitted light 16a from the light-emitting component 16 is transmitted by the optical filter 22 to the optical fiber 14.

This arrangement enables an optical signal received from the optical fiber 14 to be converted to an electric signal and supplied to the terminal, and an electric signal provided from the terminal to be converted to an optical signal and supplied to the optical fiber 14, thereby enabling bi-directional communication between terminals using optical signals.

However, there is problem that the above optical module 10 is constituted of a lot of components because the filter support member 20 is used to only support the optical filter 22.

Moreover, in the case of the above optical module 10, the transmitted light 16a produced by the light-emitting component 16 can stray and scatter within the main housing 12, and if this scattered light reaches the light-receiving component 18, it can result in noise, with respect to the received signal. One way of resolving this problem is to provide another optical filter at the light-receiving component 18 end to block stray light.

However, the provision of another member to support the optical filter further increases the number of parts. Moreover, an increase in the number of parts such as the filter support members, which are small and irregular in shape, makes the manufacturing process more complicated and increases the cost of the products.

SUMMARY OF THE INVENTION

It is therefore an object of the present invention to provide an improved optical module that enables bi-directional communication.

Another object of the present invention is to provide an optical module that is constituted of a small number of the components.

Still another object of the present invention is to provide an optical module that reduces noise caused by stray light while keeping down the increase in small, irregularly-shaped parts.

The above and other objects of the present invention can be accomplished by an optical module, comprising:

a main housing having a first attachment section that can affix an optical fiber, a second attachment section located in opposition to said first attachment section, and a third attachment section provided at a first angle to a straight line which connects said first and second attachment sections;

a filter support member supported by said first attachment section;

a light-emitting component supported by said second attachment section;

a light-receiving component supported by said third attachment section; and a first optical filter supported by said filter support member, said filter support member having a first surface which has a second angle different from said first angle to said straight line, said first optical filter being mounted on said first surface of said filter support member.

According to the present invention, because the filter support member on which the first optical filter is mounted can affix an optical fiber, it can be possible to keep down the increase in the number of parts.

In a preferred aspect of the present invention, the optical module further comprises a second optical filter supported substantially perpendicular to the light-receiving component. According to this aspect of the present invention, even if light from the light-emitting component should stray and scatter inside the main housing, it does not reach the light-receiving component but is blocked by the second optical filter. This makes it possible to reduce noise caused by stray light.

In a further preferred aspect of the present invention, the filter support member has a second surface which is substantially perpendicular to the light-receiving component, the second optical filter being mounted on the second surface of the filter support member. According to this aspect of the present invention, two optical filters are supported by a single filter support member, making it possible to keep down the increase in the number of parts. Also, the optical filters can be positioned with good precision, with almost no deviation arising in the positional relationship of the filters.

In a preferred aspect of the present invention, the second angle to be half the first angle. Thus, it is preferable for the first angle to be substantially 90 degrees and the second angle substantially 45 degrees. In accordance with this arrangement, having the first optical filter reflecting light supplied by the optical fiber and transmitting light produced by the light-emitting component makes it possible for light from the optical fiber to fall incident on the light-receiving component and light emitted by the light-emitting component to be supplied to the optical fiber.

In a further preferred aspect of the present invention, the first optical filter can reflect a light supplied from the optical fiber and can transmit a light emitted from the light-emitting component, the second optical filter can transmit a light supplied from the optical fiber and can reflect a light emitted from the light-emitting component. According to this aspect of the present invention, even if light from the light-emitting component should stray and scatter inside the main housing, it does not reach the light-receiving component but is blocked by the second optical filter. This makes it possible to reduce noise caused by stray light.

In a further preferred aspect of the present invention, the filter support member has a cylindrical portion into which the optical fiber can be inserted and first and second projecting portions both having the first surface. In this case, it is preferable that both of the first and second projecting portions further have the second surface. It is further preferable that the filter support member further has a ring portion that functions as a stop for the filter support member to the main housing provided on a peripheral of the cylindrical portion.

In a further preferred aspect of the present invention, the optical module further comprises a slider inserted in the cylindrical portion of the filter support member which can adjust a position of the optical fiber in a direction along an optical axis. In this case, it is preferable that the slider has a cylindrical structure into which a ferrule can be inserted. It is further preferable that the filter support member further has a stop portion that functions as a stop for the slider formed at an inner surface of the cylindrical portion.

In a further preferred aspect of the present invention, the filter support member can fix the optical fiber with a tilt for the straight line that preferably is not more than 5 degrees. Even when the optical fiber is cut at a predetermined inclination this arrangement makes it possible to compensate for the effects of the inclination, thereby ensuring that the optical fiber is efficiently connected to the light-emitting component.

In a further preferred aspect of the present invention, the main housing has a cylindrical structure, the first attachment section being located at one end of the main housing, the second attachment section being located at an opposite end of the main housing.

Thus, in accordance with this invention, because the filter support member on which the first optical filter is mounted can affix an optical fiber, it can be possible to keep down the increase in the number of parts. Moreover, when the second optical filter supported substantially perpendicular to the light-receiving component is employed, it is possible to reduce noise caused by stray light without increasing the number of small, irregularly-shaped filter support members, thereby making it possible to provide a high-performance optical module at a low cost.

BRIEF DESCRIPTION OF THE DRAWINGS

The above and other objects, features and advantages of this invention will become more apparent by reference to the following detailed description of the invention taken in conjunction with the accompanying drawings, wherein.

DETAILED DESCRIPTION OF THE EMBODIMENTS

Preferred embodiments of the present invention will now be described with reference to the drawings.

Figure 1:
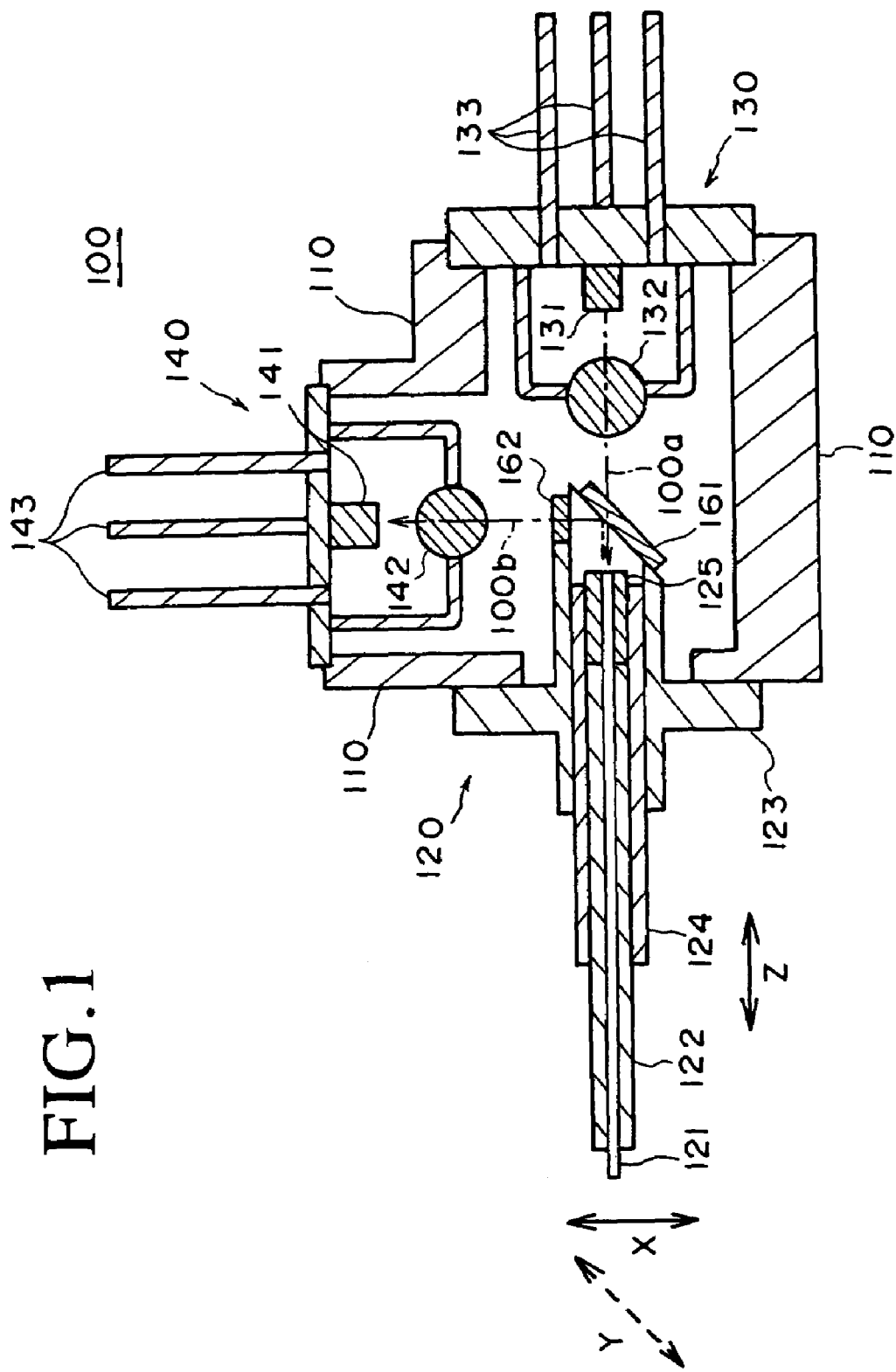
FIG. 1 is a cross-sectional view of the configuration of an optical module according to a preferred embodiment of the present invention.
Figure 2:
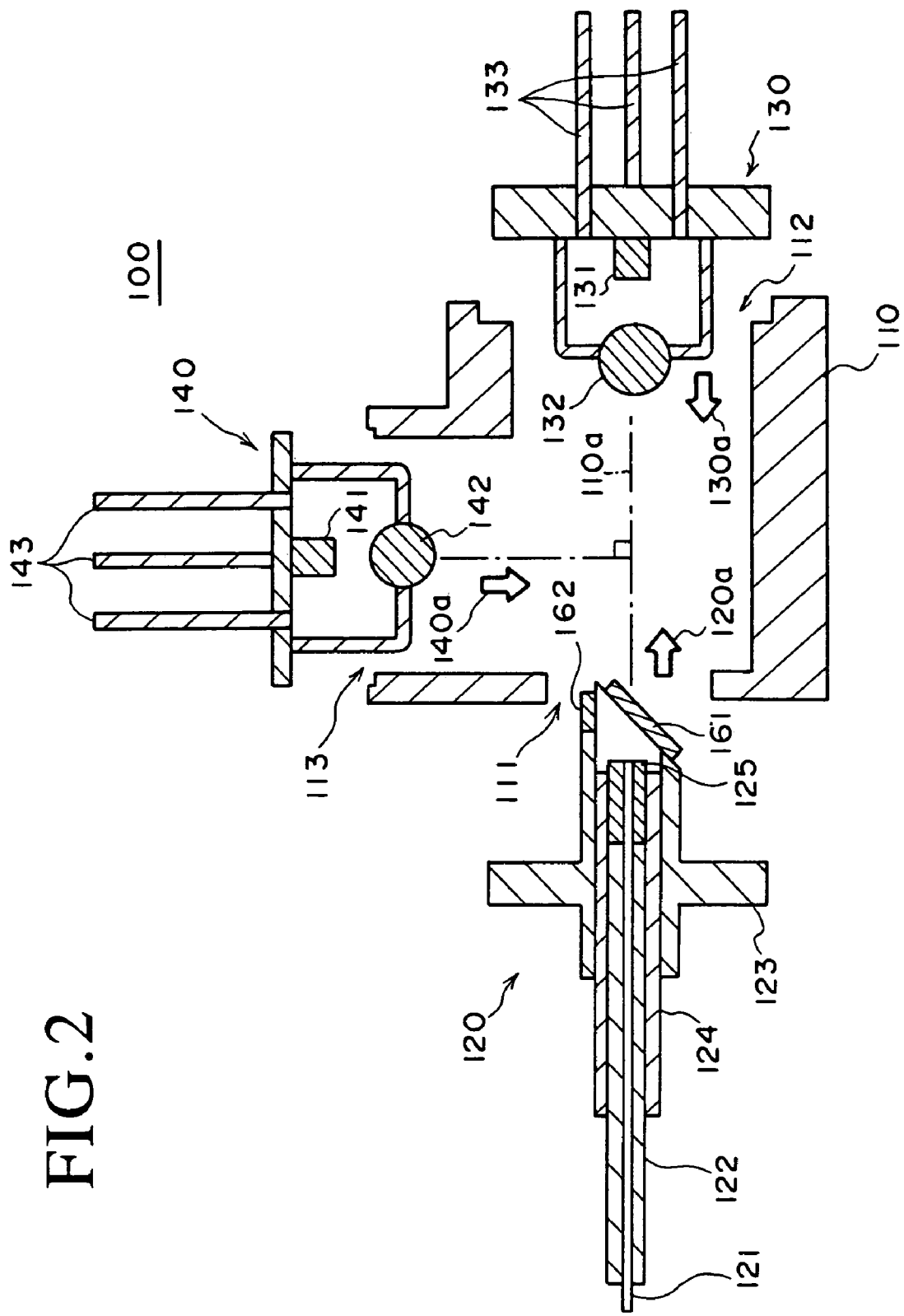
FIG. 2 is an exploded cross-sectional view of the optical module shown in FIG. 1.

FIG. 1 is a cross-sectional view of the configuration of an optical module 100 according to a preferred embodiment of the present invention, and FIG. 2 is an exploded cross-sectional view of the optical module 100.

As shown in FIGS. 1 and 2, the optical module 100 according to this embodiment includes a main housing 110, a filter support component 120 affixed to the main housing 110, a light-emitting component 130, a light-receiving component 140, and first and second optical filters 161 and 162 that are held by the filter support component 120. The optical module 100 is used to carry out bi-directional communication between terminals using optical signals. The optical module 100 does this by receiving optical signals from an optical fiber 121 that have a wavelength of, for example, about 1500 nm and converting them to electric signals, and converting electric signals from a terminal to optical signals that have a wavelength of, for example, about 1300 nm, and supplying the optical signals to the optical fiber 121.

The main housing 110 has a cylindrical structure. As shown in FIG. 2, one end of the main housing 110 is provided with a first attachment section 111 for affixing the filter support component 120, and the other end has a second attachment section 112 for affixing the light-emitting component 130. A third attachment section 113 that is provided for affixing the light-receiving component 140, is positioned at an angle of 90 degrees with respect to a straight line 110a connecting the first and second attachment sections 111 and 112. While there is no particular limitation on the material of the main housing 110, from the standpoint of mechanical strength and machining precision, it is preferable to use metal.

The filter support component 120 is attached in the direction indicated by the arrow 120a in FIG. 2, and is thereby held by the first attachment section 111, where it functions by holding not only the end of the optical fiber 121 as the optical signal transmission medium and the optical fiber cover 122, but also the first and second optical filters 161 and 162. The filter support component 120 includes a filter support member 123 that supports the first and second optical filters 161 and 162, and a cylindrical slider 124 into which is inserted a ferrule 125 that holds the end portion of the optical fiber 121. With respect to the main housing 110, the filter support member 123 can slidably move in the X direction (vertically with respect to FIG. 1) and the Y direction (normal to the page on which FIG. 1 is drawn), which allows the position of the optical fiber 121 to be adjusted perpendicularly to the optical axis. The cylindrical slider 124 can slidably move in the Z direction (from side to side with respect to FIG. 1) relative to the filter support member 123, which allows the position of the optical fiber 121 to be adjusted along the line of the optical axis. While there is no particular limitation on the material of the filter support member 123 and the cylindrical slider and 124, from the standpoint of mechanical strength and machining precision, it is preferable to use metal. A detailed structure of the filter support member 123 will be explained later.

The light-emitting component 130 is attached in the direction indicated by the arrow 130a in FIG. 2, and is thereby held by the second attachment section 112. The light-emitting component 130 includes a light-emitting element 131, such as a laser diode or the like, a lens 132 that concentrates the transmitting light 100a emitted by the light-emitting element 131, and signal pins 133 that receive the electric signals from a terminal. The function of the light-emitting component 130 is to use the light-emitting element 131 to convert an electric signal received from the terminal via the signal pins 133 into an optical signal, and transmit the optical signal to the optical fiber 121, via the lens 132. The lens 132 is not an essential component of the light-emitting component 130, and may therefore be omitted.

The light-receiving component 140 is attached in the directions indicated by the arrow 140a in FIG. 2, whereby they are held by the third attachment section 113. The light-receiving component 140 includes a light-receiving element 141, such as a photodiode or the like, a lens 142 that concentrates the receiving light 100b from the light-receiving element 141, and signal pins 143 that supply electric signals to a terminal. The function of the light-receiving component 140 is to use the light-receiving element 141 to convert an optical signal received via the lens 142 into an electric signal, and transmit the electric signal to the terminal, via the signal pins 143. The lens 142 is not an essential component of the light-emitting component 140, and may therefore be omitted.

Figure 3:
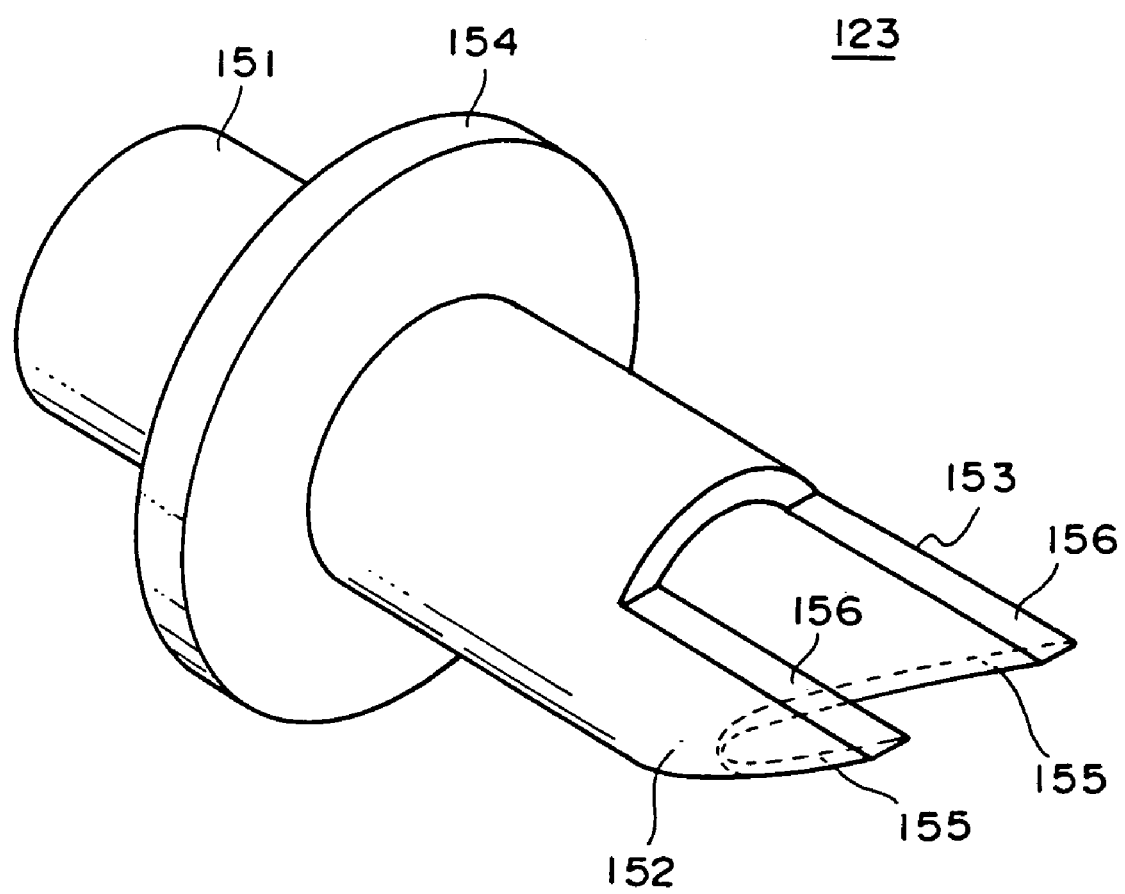
FIG. 3 is a perspective view showing the structure of the filter support member in more detail.

FIG. 3 is a perspective view showing the structure of the filter support member 123 included in the filter support component 120 in more detail.

As shown in FIG. 3, the filter support member 123 comprises a cylindrical portion 151, first and second projecting portions 152 and 153 provided on one end of the cylindrical portion 151, and a ring portion 154 provided on the peripheral of the cylindrical portion 151. The ring portion 154 functions as a stop for the filter support component 120 to the main housing 110.

As shown in FIG. 3, the first and second projecting portions 152 and 153 are curved parts formed by cutting a section of the end of the cylindrical portion 151 crossly and cutting another part the cylindrical portion 151. The first and second projecting portions 152 and 153 each has a surface (first surface) 155 that is at an angle of 45 degrees to the path of the transmitting light 100a. The first optical filter 161 is maintained on this first surface 155. Thus, the first optical filter 161 is maintained at an angle of 45 degrees to the path of the transmitting light 100a. The first and second projecting portions 152 and 153 also has a surface (second surface) 156 that is substantially perpendicular to the light-receiving component 140, and on which the second optical filter 162 is maintained.

The first optical filter 161 reflects the receiving light 100b from the optical fiber 121 and transmits the transmitting light 100a from the light-emitting component 130. The second optical filter 162 transmits the receiving light 10b from the optical fiber 121 and reflects the transmitting light 100a from the light-emitting component 130. Therefore, while the transmitting light 100a produced by the light-emitting component 130 is transmitted by the first optical filter 161 to the optical fiber 121, the receiving light 100b from the optical fiber 121 is reflected by the first optical filter 161, changing the path 90 degrees, after which the light falls substantially perpendicularly incident on the second optical filter 162 and is thereby transmitted to the light-receiving component 140.

Thus, the optical module 100 according to this embodiment has the above-described configuration. Since the transmitting light 100a is reflected by the second optical filter 162, even if the transmitting light 100a should stray and scatter in the main housing 110, the stray light is blocked by the second optical filter 162 from reaching the light-receiving component 140. This enables noise caused by stray light to be reduced. Moreover, because in the case of this optical module 100 the two optical filters 161 and 162 are held by just the one filter support component 120 (filter support member 123) which is used to hold the optical fiber 121, it is possible to keep down the number of parts. Having the two optical filters 161 and 162 held by the one filter support member 123 also provides good positioning accuracy, since there is almost no deviation in the positional relationship of the two filters.

Figure 4:
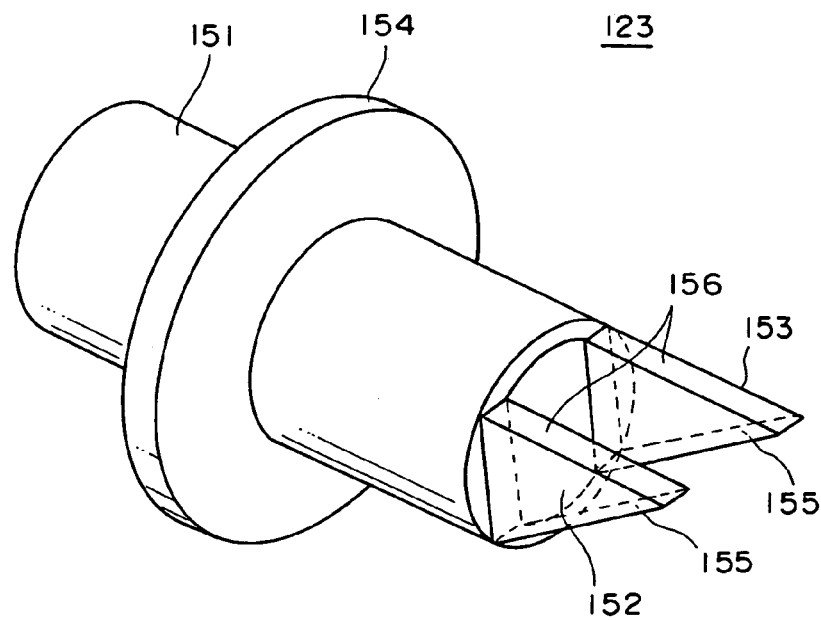
FIG. 4 is a perspective view showing another structure of the filter support member.
Figure 5:
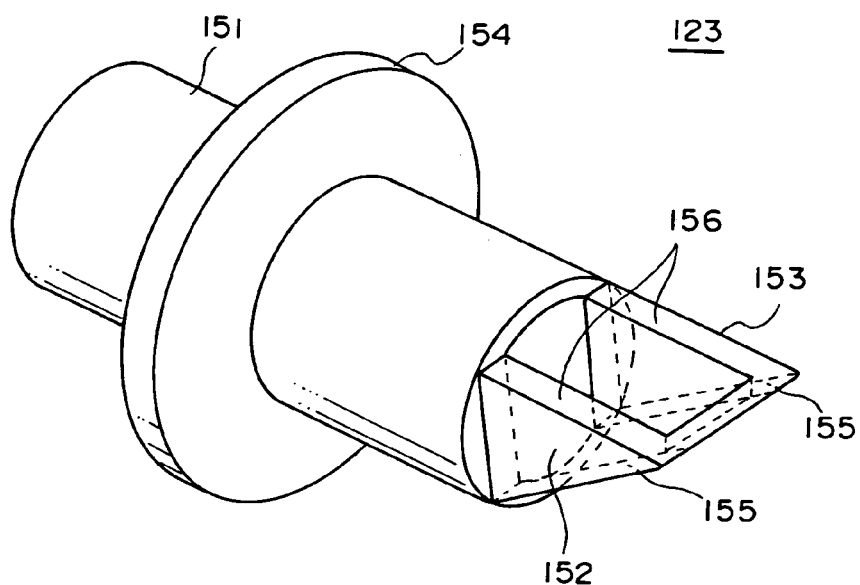
FIG. 5 is a perspective view showing still another structure of the filter support member.
Figure 6:
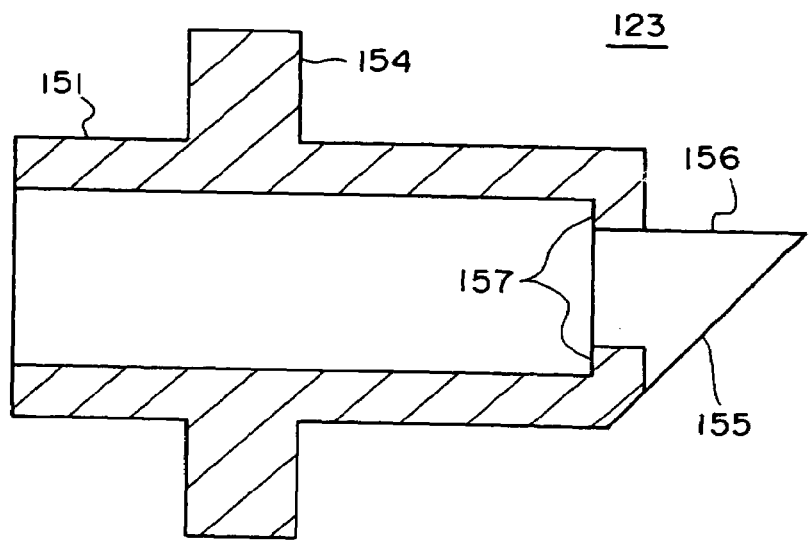
FIG. 6 is a perspective view showing still another structure of the filter support member.

The filter support member 123 included in the filter support component 120 is not limited to the structure shown in FIG. 3, but can instead have various other types of structure. As shown in FIG. 4, for example, in shape, the first and second projecting portion 152 and 153 can be flat plates, or as shown in FIG. 5, ends of the first and second projecting portion 152 and 153 can be connected. Moreover, as shown in FIG. 6, a stop portion 157 as the stop for the slider 124 can be formed at the inner surface of the cylindrical portion 151.

Figure 7:
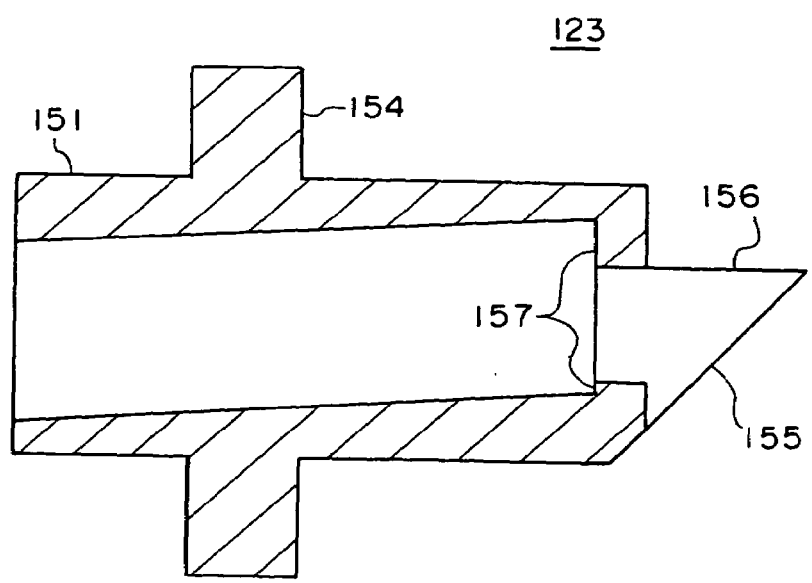
FIG. 7 is a perspective view showing still another structure of the filter support member.

Or, as shown in FIG. 7, the inner surface of the cylindrical portion 151 can be inclined. In this case, the optical fiber 121 can be affixed at a predetermined tilt to the straight line between the first attachment section (111) and the second attachment section (112). This is done so that when the optical fiber is terminated at an inclined angle to the optical axis rather than perpendicular thereto, in order to reduce the effects of reflection at the terminal portion of the optical fiber 121, the effect of the inclination can be compensated to efficiently couple the optical fiber 121 to the light-emitting component 130. An efficient coupling can be ensured by setting the tilt of the optical fiber 121 at no more than 5 degrees.

Figure 8:
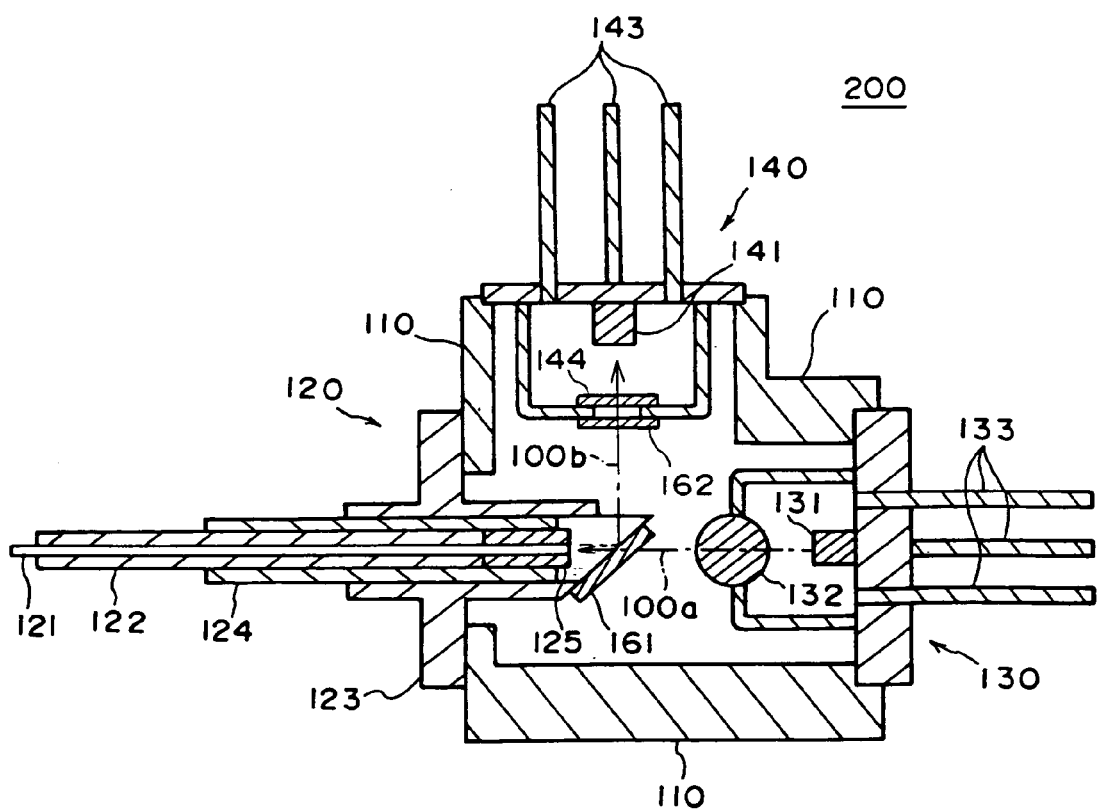
FIG. 8 is a cross-sectional view of the configuration of an optical module according to another preferred embodiment of the present invention.

FIG. 8 is a cross-sectional view of the configuration of an optical module 200 according to another preferred embodiment of the present invention.

The optical module 200 differs from the optical module 100 of FIG. 1 in that the second optical filter 162 is maintained at not the filter support component 120 but the light-receiving component 140 having a transparent window 144. In this embodiment, the filter support component 120 does not have to include the second surface 156 because the surface of the light-receiving component 140 is used as the second surface 156. The optical module 200 is suitable when the light-receiving component 140 does not contain a lens 142, or when the light-receiving component 140 does contain a lens 142 that does not project and has a flat surface.

Figure 9:
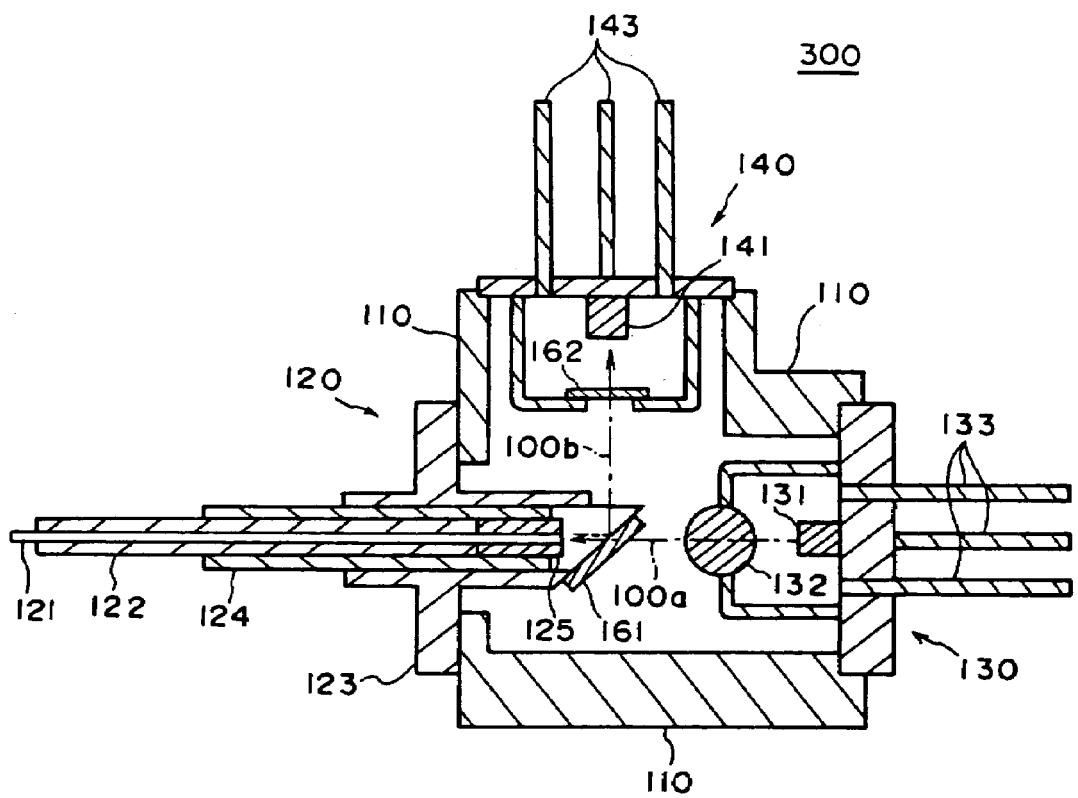
FIG. 9 is a cross-sectional view of the configuration of an optical module according to still another preferred embodiment of the present invention.
Figure 10:
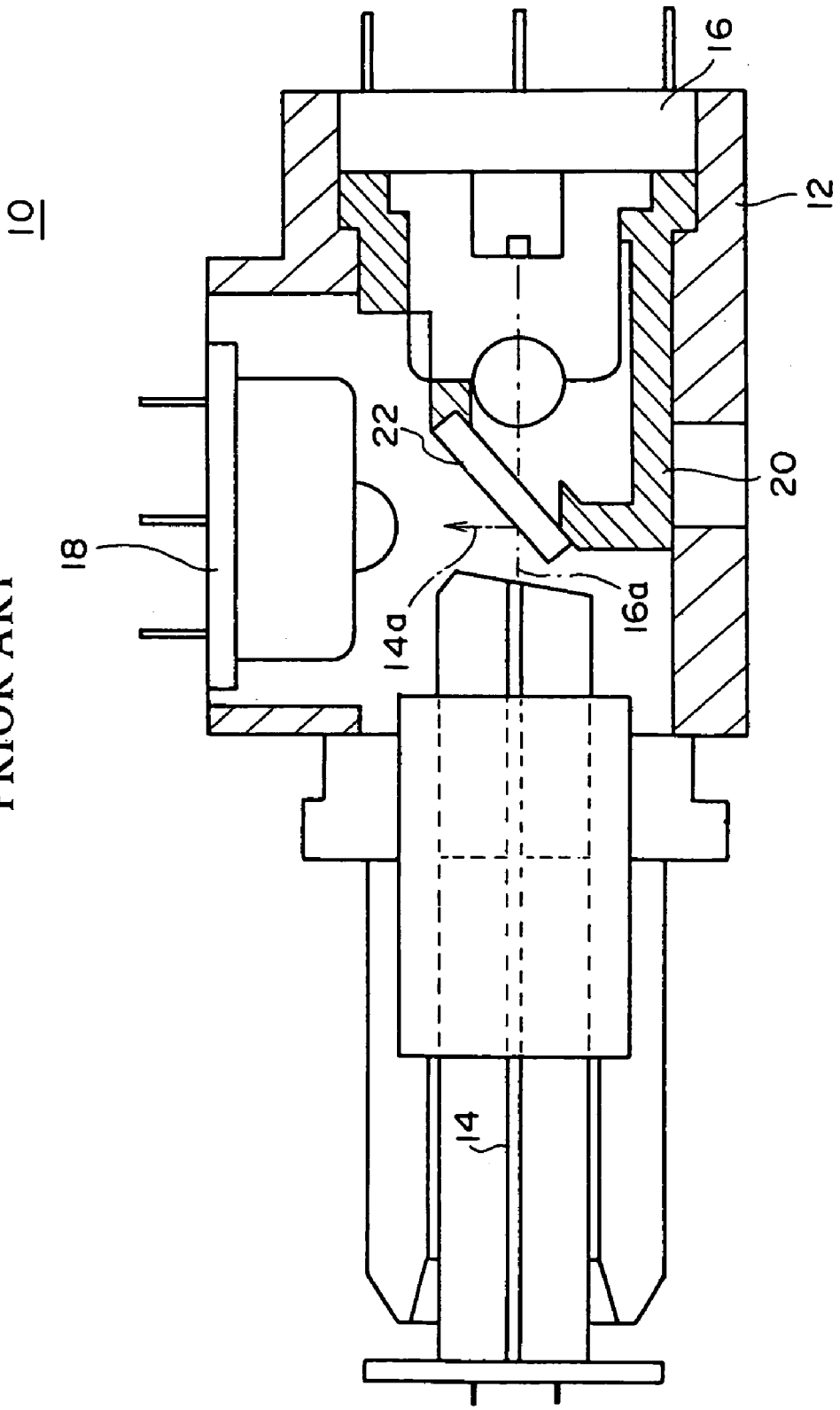
FIG. 10 is a cross-sectional view of the structure of a conventional optical module 10 described in Japanese Utility Model Registration No. 3,095,902.

FIG. 9 is a cross-sectional view of the configuration of an optical module 300 according to still another 6 preferred embodiment of the present invention.

The optical module 300 differs from the optical module 200 of FIG. 8 in that the second optical filter 162 is maintained at the inside of the light-receiving component 140. In other words, the transparent window 144 itself functions as the second optical filter 162. The effect obtained with this configuration is the same as that obtained with the optical module 200 of FIG. 8.

The present invention is in no way limited to the aforementioned embodiments, but rather various modifications are possible within the scope of the invention as recited in the claims, and naturally these modifications are included within the scope of the invention.

For example, although kin the foregoing the third attachment section 113 is described as being provided at an angle of 90 degrees to a straight line 110a connecting the first attachment section 111 and the second attachment section 112 (see FIG. 2), with the first optical filter 161 being maintained at an angle of 45 degrees to the line 110a, so long as the latter angle is half the former angle, the respective angles do not have to be 90 degrees and 45 degrees.

Moreover, although in the foregoing the second optical filter 162 that transmits the receiving light 100b and reflects the transmitting light 100a is employed, the second optical filter 162 is not an essential in the present invention, and may therefore be omitted. However, it is preferable that the second optical filter 162 is employed because the second optical filter 162 reduces the noise a caused by stray light.

What is claimed is:

1. An optical module, comprising:
   a main housing having a first attachment section that can affix an optical fiber, a second attachment section located in opposition to said first attachment section, and a third attachment section provided at a first angle to a straight line which connects said first and second attachment sections;
   a filter support member supported by said first attachment section;
   a light-emitting component supported by said second attachment section;
   a light-receiving component supported by said third attachment section; and
   a first optical filter supported by said filter support member, said filter support member having a first surface which has a second angle different from said first angle to said straight line, said first optical filter being mounted on said first surface of said filter support member, wherein the filter support member optically isolates the light-receiving component from the main housing and has a hollow portion that surrounds a ferrule that is separate from the filter support member, a slider, or the optical fiber surrounded by an optical fiber cover, and wherein said ferrule includes another optical fiber, said filter support member has a cylindrical portion into which said optical fiber surrounded by an optical fiber cover and said ferrule are inserted and first and second projecting portions both having said first surface for mounting a first side of the first optical filter thereon.

2. The optical module as claimed in claim 1, further comprising a second optical filter supported substantially perpendicular to said light-receiving component.

3. The optical module as claimed in claim 2, wherein said filter support member has a second surface which is substantially perpendicular to said light-receiving component, said second optical filter being mounted on said second surface of said filter support member.

4. The optical module as claimed in claim 1, further comprising a filter support component including the filter support member, that holds the first filter, and the slider, wherein the filter support component provides the means for adjusting the optical fiber surrounded by an optical fiber cover in at least three directions, X, Y and Z.

5. The optical module as claimed in claim 4, wherein said second angle is half of said first angle and said first angle is substantially 90 degrees and said second angle is substantially 45 degrees.

6. The optical module as claimed in claim 1, wherein said first optical filter can reflect a light supplied from said optical fiber and can transmit a light emitted from said light-emitting component.

7. The optical module as claimed in claim 2, wherein said second optical filter can transmit a light supplied from said optical fiber and can reflect a light emitted from said light-emitting component.

8. The optical module as claimed in claim 1, wherein the filter support member includes an inner surface inclined relative to an outer surface so as to reduce reflection at a terminal portion of the optical fiber and said tilt is less than or equal to 5 degrees.

9. The optical module as claimed in claim 1, wherein both of said first and second projecting portions further have a second surface for mounting a second optical filter on.

10. The optical module as claimed in claim 1, wherein said filter support member further has a ring portion that functions as a stop for said filter support member to said main housing provided on a peripheral of said cylindrical portion.

11. The optical module as claimed in claim 1, wherein the slider inserted in said cylindrical portion of said filter support member is a cylindrical slider which can move along a direction of an optical axis so as to adjust a position of said optical fiber surrounded by an optical fiber cover in a direction along the optical axis by movement of the slider along the direction of the optical axis.

12. The optical module as claimed in claim 11, wherein said slider has a cylindrical structure into which said ferrule including another optical fiber and said optical fiber surrounded by an optical fiber cover are inserted.

13. The optical module as claimed in claim 11, wherein said filter support member further has a stop portion that functions as a stop for the slider formed at an inner surface of said cylindrical portion.

14. The optical module as claimed in claim 1, wherein said filter support member can fix said optical fiber with a tilt from said straight line.

15. The optical module as claimed in claim 14, wherein the filter support member includes an inner surface inclined relative to an outer surface so as to reduce reflection at a terminal portion of the optical fiber and said tilt is less than or equal to 5 degrees.

16. The optical module as claimed in claim 1, wherein said main housing has a cylindrical structure, said first attachment section being located at one end of the main housing, said second attachment section being located at an opposite end of the main housing.

17. An optical module, comprising:
   a main housing having a first attachment section that can affix an optical fiber, a second attachment section located in opposition to said first attachment section, and a third attachment section provided at a first angle to a straight line which connects said first and second attachment sections;
   a filter support member supported by said first attachment section;
   a light-emitting component supported by said second attachment section;
   a light-receiving component supported by said third attachment section: and
   a first optical filter supported by said filter support member, said filter support member having a first surface which has a second angle different from said first angle to said straight line said first optical filter being mounted on said first surface of said filter support member, wherein the filter support member optically isolates the light-receiving component from the main housing and has a hollow portion that surrounds a ferrule that is separate from the filter support member, a slider, or the optical fiber surrounded by an optical fiber cover, wherein the filter support member can fix the optical fiber with a tilt from the straight line, and wherein the filter support member includes an inner surface inclined relative to an outer surface so as to reduce reflection at a terminal portion of the optical fiber and the tilt is less than or equal to 5 degrees.

18. The optical module as claimed in claim 17, wherein the slider can move along a direction of an optical axis so as to adjust a position of the optical fiber surrounded by an optical fiber cover in a direction along the optical axis by movement of the slider along the direction of the optical axis.

19. The optical module as claimed in claim 18, wherein the filter support member further has a stop portion that functions as a stop for the slider.

20. An optical module comprising;
a housing;
a first light communication member coupled to the housing at a first location;
a second light communication member coupled to the housing at a second location;
a ferrule;
a slider surrounding at least a portion of the ferrule;
an optical fiber surrounded by an optical fiber cover, and at least a portion of the optical fiber cover being surrounded by the slider;
a filter support member attached to the housing and surrounding at least a portion of slider;
a first filter attached to the filter support member at a first angle;
a second filter attached to the filter support member at a second angle;
a third light communication member coupled to the filter support member, wherein the filter support member and the second filter optically isolate the third light communication member from the housing and blocks undesired stray and scattered light from the first light communication member within the housing that is not incident on the one or more optical filters from reaching the third light communication member; and
a filter support component including the filter support member, that holds the first filter and second filter, and the slider, wherein the filter support component provides the means for adjusting the optical fiber surrounded by an optical fiber cover in at least three directions, X, Y and Z, wherein the filter support member has a hallow portion that surrounds the ferrule that is separate from the filter support member, the slider, or the optical fiber surrounded by an optical fiber cover, and wherein the ferrule includes another optical fiber, the filter support member has a cylindrical portion into which the optical fiber surrounded by an optical fiber cover and the ferrule are inserted and first and second projecting portions both having said first surface for mounting a first side of the first optical filter thereon.

* * * * *

UNITED STATES PATENT AND TRADEMARK OFFICE
CERTIFICATE OF CORRECTION

| | |
|---|---|
| PATENT NO. | : 7,403,716 B2 |
| APPLICATION NO. | : 10/884953 |
| DATED | : July 22, 2008 |
| INVENTOR(S) | : Adrian Lo et al. |

It is certified that error appears in the above-identified patent and that said Letters Patent is hereby corrected as shown below:

On the title page, item [75], 3rd inventor: (Tohru Kineri) city name on the first page of the Patent should be correctly changed to --Yamaguchi--

On the title page, item [74]: Firm name on the first page of the Patent should be correctly spelled --Wolff Law Offices, PLLC--

Claim 17 is missing a comma in the last element and should read --said straight line, said first optical fiber . . .--

Signed and Sealed this

Twenty-first Day of October, 2008

JON W. DUDAS
*Director of the United States Patent and Trademark Office*

UNITED STATES PATENT AND TRADEMARK OFFICE
CERTIFICATE OF CORRECTION

PATENT NO. : 7,403,716 B2  Page 1 of 1
APPLICATION NO. : 10/884953
DATED : July 22, 2008
INVENTOR(S) : Adrian Lo et al.

It is certified that error appears in the above-identified patent and that said Letters Patent is hereby corrected as shown below:

On the title page, item [75], 3rd inventor: (Tohru Kineri) city name on the first page of the Patent should be correctly changed to --Yamaguchi--

On the title page, item [74]: Firm name on the first page of the Patent should be correctly spelled --Wolff Law Offices, PLLC--

Column 9, lines 2 and 3, Claim 17, is missing a comma in the last element and should read --said straight line, said first optical fiber . . .--

This certificate supersedes the Certificate of Correction issued October 21, 2008.

Signed and Sealed this

Eleventh Day of November, 2008

JON W. DUDAS
*Director of the United States Patent and Trademark Office*